UNITED STATES PATENT OFFICE.

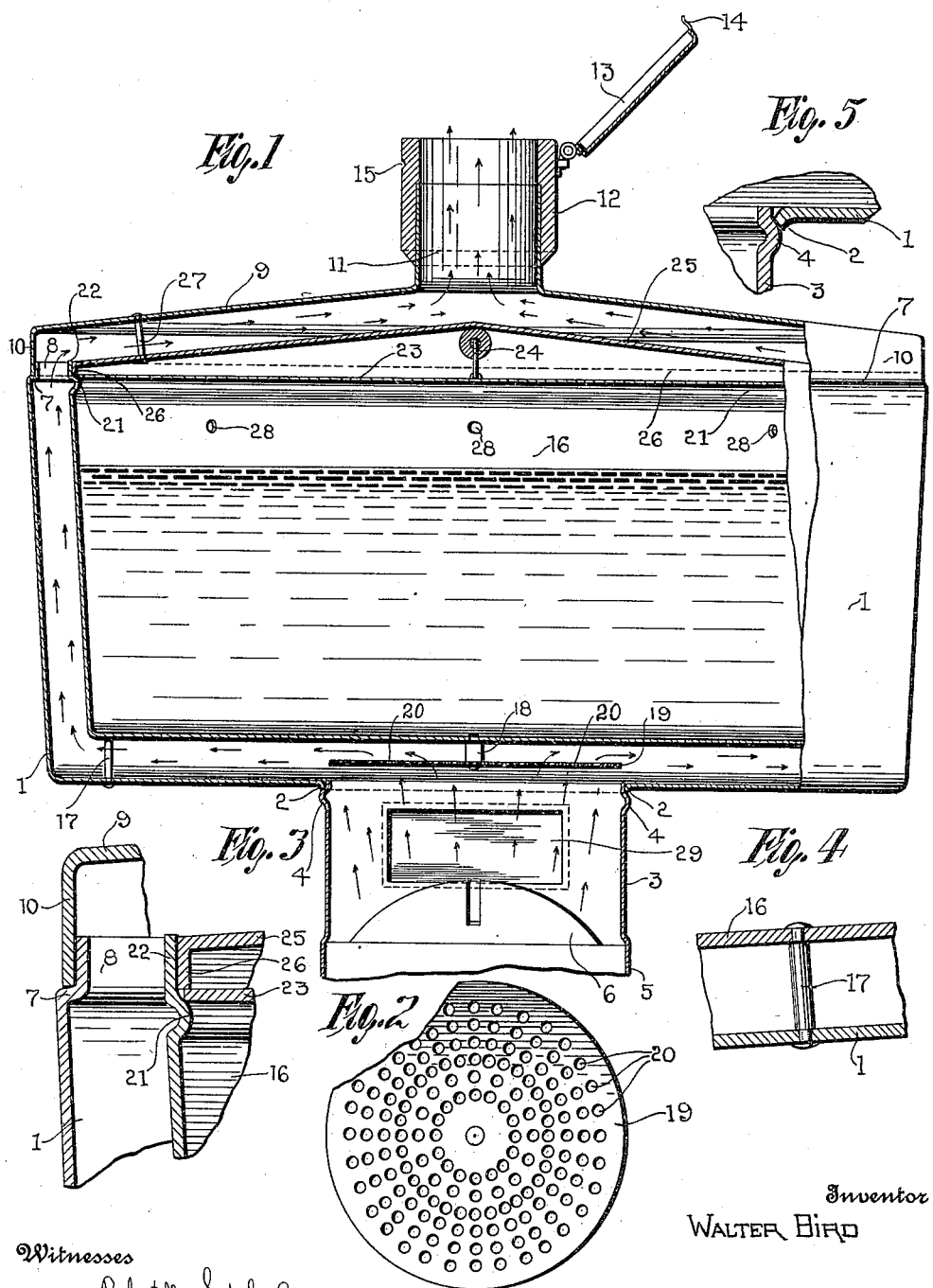

WALTER BIRD, OF HAVANA, ARKANSAS, ASSIGNOR OF ONE-THIRD TO A. S. BUCKMAN, OF HAVANA, ARKANSAS.

COOKER.

1,006,903.  Specification of Letters Patent.  Patented Oct. 24, 1911.

Application filed December 21, 1910. Serial No. 598,642.

*To all whom it may concern:*

Be it known that I, WALTER BIRD, a citizen of the United States, residing at Havana, in the county of Yell and State of Arkansas, have invented certain new and useful Improvements in Cookers, of which the following is a specification, reference being had therein to the accompanying drawing.
This invention relates to cookers for use in connection with lamps, gas jets and other sources of heat, and the principal object of the same is to provide a cooker that can be readily attached to or detached from a source of heat and which can be readily used for baking, frying or boiling.

With the above and other objects in view the invention contemplates providing an outer receptacle adapted for engagement with a source of heat, an inner receptacle for the articles to be cooked and which is retained in spaced relation to the outer receptacle so that the heat will circulate about the inner receptacle and escape through an upper outlet of the outer casing.

The invention also contemplates a novel cover for the cooker that is made in two sections held in spaced relation, one section fitting over the outer receptacle and the other fitting over the inner receptacle, said sections being rigidly connected so that both sections can be simultaneously removed from the receptacles.

Other objects and advantages of the invention will be apparent from the following detailed description and accompanying drawing, wherein a preferred and practical embodiment of the invention has been described and illustrated.
In said drawings:—Figure 1 is a view partly in vertical section and partly in elevation of the improved cooker as it appears in use. Fig. 2 is a plan view of the heat distributer forming a part of this invention.
Fig. 3 is a fragmentary detail vertical sectional view showing the manner of seating the covers on the receptacles. Fig. 4 is a similar view of the manner of spacing the receptacles and the cover sections. Fig. 5 is another similar view showing the manner of connecting the outer receptacle to the source of heat-engaging neck or funnel.

Referring to the accompanying drawings by numerals, it will be seen that the improved cooker comprises an outer receptacle 1 that may be of a rectangular or any other suitable or desirable shape and is provided with a central base opening that is surrounded by a pendent flange 2. A tubular neck or funnel 3 has its upper end fitted within flange 2 and has an external, annular shoulder 4 formed on its outer surface adjacent its upper end that forms a seat for the flange 2. The receptacle 1 and neck 3 are preferably formed of resilient sheet metal so that they will have a tight, but separable connection. The base of the neck 3 is preferably enlarged to form an annular flange 5 that is fitted over a source of heat, such, for example as the lamp burner 6 shown in Fig. 1.

The upper end of receptacle 1 is provided with an external annular shoulder 7 and a collar flange 8. A cover 9 has a pendent flange 10 at its outer edge adapted to be fitted over flange 8 and rested on shoulder 7. Said cover 9 is provided with a centrally located upstanding outlet tube 11 that is preferably integral with the cover 9 and which is surrounded by heat insulating material 12 which may be in the form of a tubular knob so that the cover can be removed by grasping said knob. The knob 12 preferably projects above the tube 11 and has a sealing cap 13 hinged thereto that is provided with a spring latch 14 for engaging a notch 15 formed in the knob to lock the cap in sealing position.

An inner receptacle 16 that is of the same shape, but smaller, than the outer receptacle 1, is retained in spaced relation to the bottom and sides of said outer receptacle 1 by the shouldered rivets 17 or other suitable spacing means. The bottom of said receptacle 16 is provided with a centrally located pendent hanger 18, preferably a shouldered rivet, that suspends a deflecting and distributing disk 19 over the upper end of neck 3 in spaced relation thereto. Said disk is provided with a plurality of perforations 20.

The upper portion of receptacle 16 is provided with an internal annular shoulder 21 from which a collar flange 22 projects. A flat lid 23 is adapted to be seated on shoulder 21 and is provided with a central handgrip
24. A cover 25 that is of substantially the same shape as cover 9 of receptacle 1 has its outer edge provided with a pendent flange 26 that is adapted to be fitted within collar flange 22 and rest on lid 23 to retain said lid on the shoulder 21. Cover 25 is retained in rigid spaced relation to cover 9 by the shouldered rivets 27 or other suitable spacing means.

In Fig. 1 arrows have been used to indicate the course of the heat about inner receptacle 16 and it will be seen by reference to said figure that the heat from the burner 6 is deflected and distributed by the disk 19 so that it will circulate about the inner receptacle and escape through the outlet tube, and as suggested in said Fig. 1, openings 28 are formed in the upper portion of inner receptacle 16 so that steam and the like can escape therefrom.

The cooker can be used for baking, boiling, or frying. When used for frying, it will be obvious that the covers 9 and 25 and lid 23 are removed.

It will be understood of course that the cooker may be used as a chafing dish.

A sight opening 29 is formed in the neck 3 to permit the flame of the burner to be inspected.

What I claim as my invention is:—

1. A cooker comprising an outer receptacle, a depending heat conducting neck carried by the base thereof and adapted for engagement with a source of heat supply, an inner receptacle, means for retaining the same in spaced relation to the outer receptacle, a perforated deflecting disk depending from said inner receptacle over the outlet end of said neck, a cover for the outer receptacle provided with a discharge tube, means for sealing said tube, a cover for the inner receptacle, means for fastening the inner receptacle cover to the outer receptacle cover in spaced relation, and a lid for the inner receptacle retained in sealing relation to said receptacle by the cover thereof.

2. A cooker comprising an outer receptacle provided with heat inlet means, said receptacle having an external upper shoulder, a cover seated on said shoulder and provided with a discharge tube, a heat insulating knob carried by said tube, a cap carried by said knob for sealing said tube, an inner receptacle, means for retaining the same in spaced relation to the outer receptacle, a cover for the inner receptacle, and means for retaining the same in spaced relation to the cover of the outer receptacle.

3. A cooker comprising an inner and an outer receptacle, means for retaining the receptacles in spaced relation, a cover for the outer receptacle provided with a discharge outlet, a cover for the inner receptacle, a lid within the inner receptacle and retained in sealing relation thereto by the cover of the inner receptacle, means for connecting the covers in spaced relation, and means for admitting heat to the outer receptacle.

In testimony whereof I hereunto affix my signature in presence of two witnesses.

WALTER BIRD.

Witnesses:
A. S. BUCKMAN,
N. I. GUEST.

Copies of this patent may be obtained for five cents each, by addressing the "Commissioner of Patents, Washington, D. C."